United States Patent [19]
Wilson

[11] Patent Number: 5,693,927
[45] Date of Patent: Dec. 2, 1997

[54] VEHICLE ACCELERATOR PEDAL SWITCH ACTUATOR

[76] Inventor: Dallas W. Wilson, 14888 NE. Thompson, Portland, Oreg. 97230

[21] Appl. No.: 592,743

[22] Filed: Jan. 25, 1996

[51] Int. Cl.⁶ ......................................... H01H 3/14
[52] U.S. Cl. .................. 200/86.5; 338/153; 200/61.89; 303/20
[58] Field of Search .................. 200/86.5, 61.89; 338/153, 215, 103, 108; 303/20

[56] References Cited

U.S. PATENT DOCUMENTS

| | | | |
|---|---|---|---|
| 3,833,782 | 9/1974 | Bartel | 200/86.5 |
| 4,087,776 | 5/1978 | Donato | 338/198 |
| 4,322,711 | 3/1982 | Spangler et al. | 338/198 X |
| 4,958,607 | 9/1990 | Lundberg | 180/335 X |
| 5,039,973 | 8/1991 | Carballo | 338/153 |
| 5,062,317 | 11/1991 | Saliba | 338/153 X |
| 5,063,811 | 11/1991 | Smith et al. | 200/61.89 X |
| 5,133,225 | 7/1992 | Lundberg et al. | 200/61.89 X |
| 5,321,980 | 6/1994 | Hering et al. | 73/118.1 |

Primary Examiner—J. R. Scott
Attorney, Agent, or Firm—Olson & Olson

[57] ABSTRACT

A conventional electronic foot accelerator pedal of an electronic engine control module is fitted with a link one end of which engages the roller of the potentiometer arm on the pedal and the other end of which is disposed for releasable engagement with the plunger of an electric switch which is connected in an electric circuit of the electrically actuated engine brake or other electrically actuated device. As the pedal is pivoted to accelerate the engine, the link disengages from the electric switch plunger and opens the switch to deactivate the electrically actuated device. When the pedal is returned to the engine idle position, the link engages the switch plunger and closes the switch to activate the electrically actuated device.

9 Claims, 3 Drawing Sheets

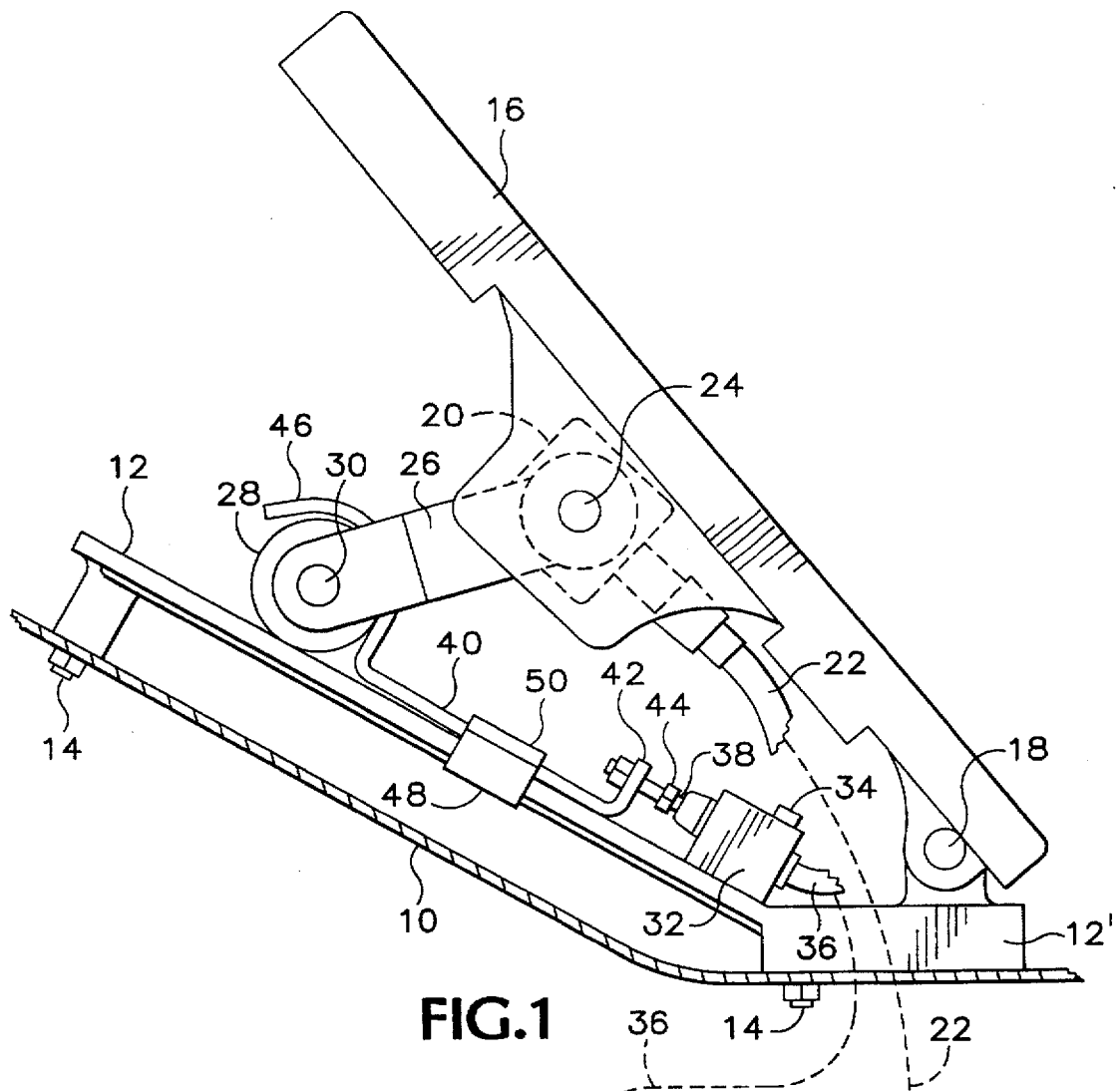
FIG.1
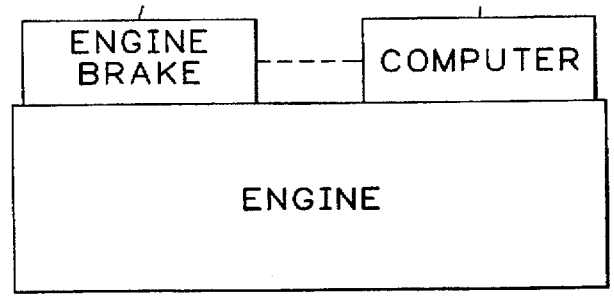

1

VEHICLE ACCELERATOR PEDAL SWITCH ACTUATOR

BACKGROUND OF THE INVENTION

This invention relates to vehicle engine brakes, and more particularly to an accelerator pedal-controlled actuator for an electric switch operator for a vehicle engine brake or other electric device.

The engines of most truck tractors are provided with an electrically actuated brake which is controlled by a computer programmed to respond to the position of the engine accelerator pedal, to release the brake during acceleration and to apply the brake when the accelerator pedal is brought to idle position. However, many truck owners find it necessary or desirable to avoid the high cost of re-programming the electronic control module for using the electronic brake control. Heretofore, the only way of avoiding such cost has been to not utilize the engine brake.

SUMMARY OF THE INVENTION

This invention provides an attachment to a conventional electronic foot accelerator pedal by which an engine brake or other electrical device is controlled by utilizing the movement of the pedal-actuated potentiometer arm of the electronic engine control module to actuate an electric switch in the electric circuit of the electrical device.

It is the principal objective of this invention to provide an attachment to a conventional electronic foot accelerator pedal by which to operate a simple electric switch to control an engine brake or other electrical device.

A further objective of this invention is the provision of an attachment of the class described which enables operation of the brake of an electronically controlled engine without utilizing a programmed electronic control module.

Still another objective of this invention is to provide an attachment of the class described which allows selection of control of an engine brake either by the electronic control module or by a simple electric switch.

A further objective of this invention is the provision of an attachment of the class described which involves no change to the electronic control module operating mechanism on the elontronic foot accelerator pedal of an electronically controlled engine.

A still further objective of this invention is the provision of an attachment of the class described which is of simplified construction for economical manufacture, maintenance and repair.

The foregoing and other objects and advantages of this invention will appear from the following detailed description, taken in connection with the accompanying drawings of a preferred embodiment.

BRIEF DESCRIPTION OF THE DRAWINGS

FIG. 1 is a side elevation of an electronic foot accelerator pedal having attached thereto an electric switch pedal actuator embodying the features of this invention, the accelerator pedal being shown in elevated position and the electric switch closed by engagement of the link member with the switch actuator.

DESCRIPTION OF THE PREFERRED EMBODIMENT

Figure 1A:
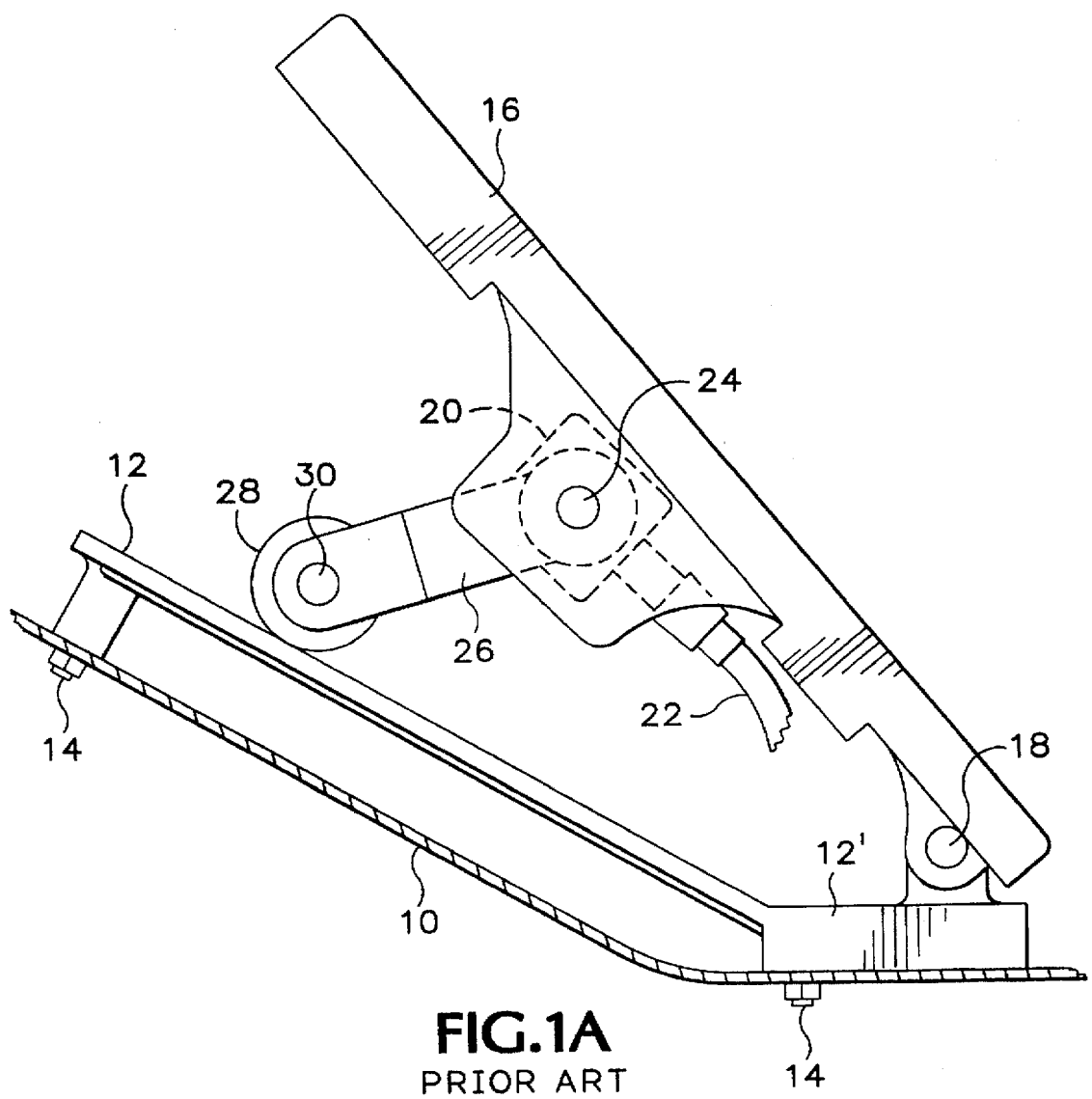
FIG. 1A is a side elevation of a conventional, prior art electronic foot accelerator pedal for the computer control of a truck tractor engine and electrically actuated engine brake.

FIG. 1A shows a conventional electronic foot accelerator pedal for controlling operation of a truck tractor engine. The pedal is shown mounted on the floorboard 10 of a tractor. The pedal includes a mounting plate 12 with a rear angled segment 12' conforming to the contour of the floorboard. Anchor screws 14 secure the mounting plate to the floorboard.

Accelerator pedal 16 is mounted at its rear end on the mounting plate 12 by pivot shaft 18. Intermediate the ends of the elongated pedal, and on its underside, is mounted an electrical potentiometer 20. An electrical conductor cable 22 extends from the potentiometer and is provided at its outer end with a terminal connector for coupling to a computer (not shown) which controls operation of the tractor engine.

The pivot shaft 24 of the movable contact of the potentiometer is secured non-rotatably to one end of a spring loaded operating arm 26. The opposite end of the arm mounts a roller 28 on pivot shaft 30. The roller is movable along the upper surface of the mounting plate 12 as the accelerator pedal 16 is depressed during operation of the tractor engine.

The foregoing assembly forms a conventional electronic accelerator pedal the operation of which effects adjustment of the potentiometer 20 and consequent activation of the computer, to control the operating speed of the tractor engine. Moreover, if the computer is properly programmed the engine brake is deactivated when the pedal 16 is moved from idle position to effect acceleration of the engine. And when the accelerator pedal is returned to idle position, the engine brake is activated.

Figure 2:
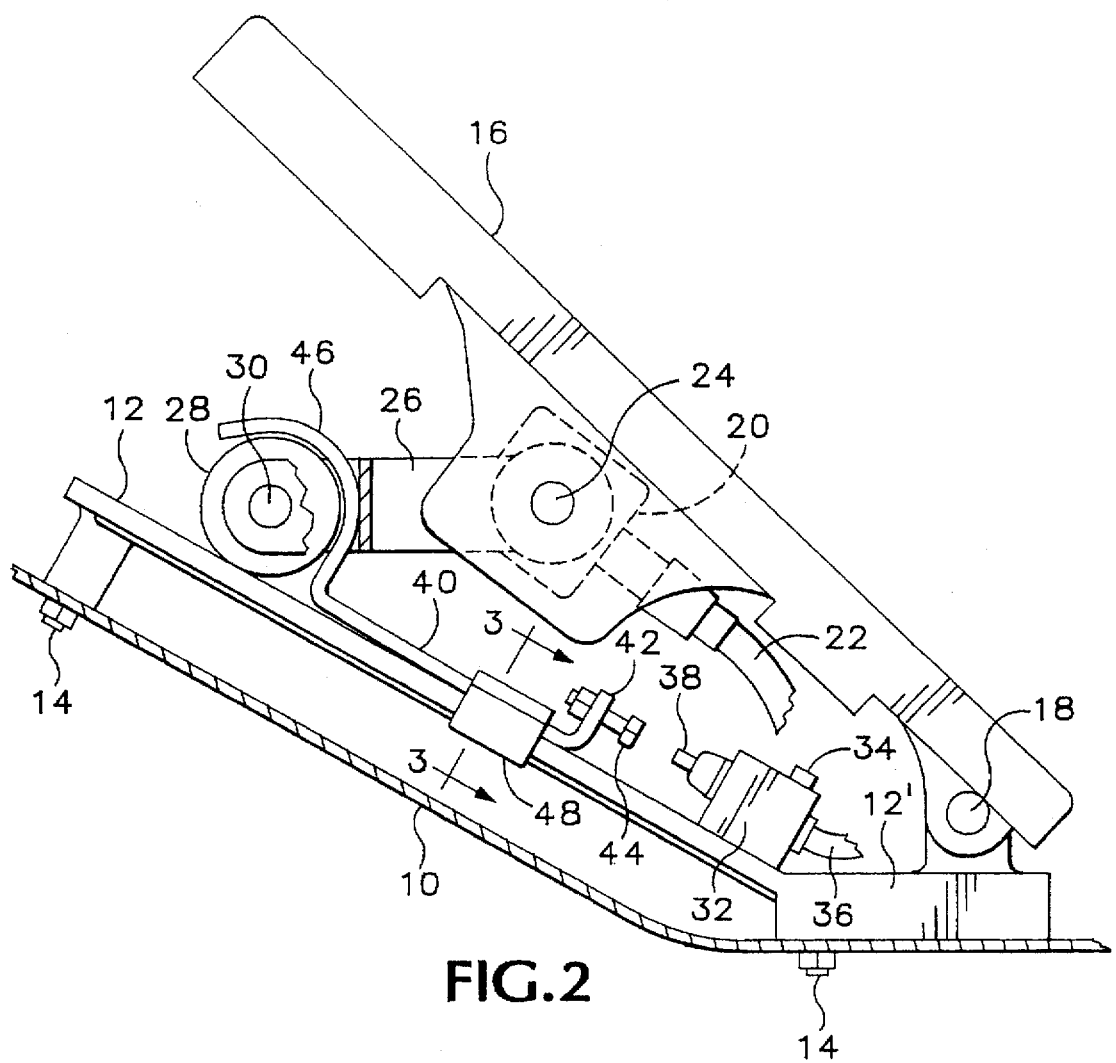
FIG. 2 is a side elevation similar to FIG. 1 showing the accelerator pedal depressed to an engine accelerating position and the electric switch opened by the retracted link member.
Figure 3:
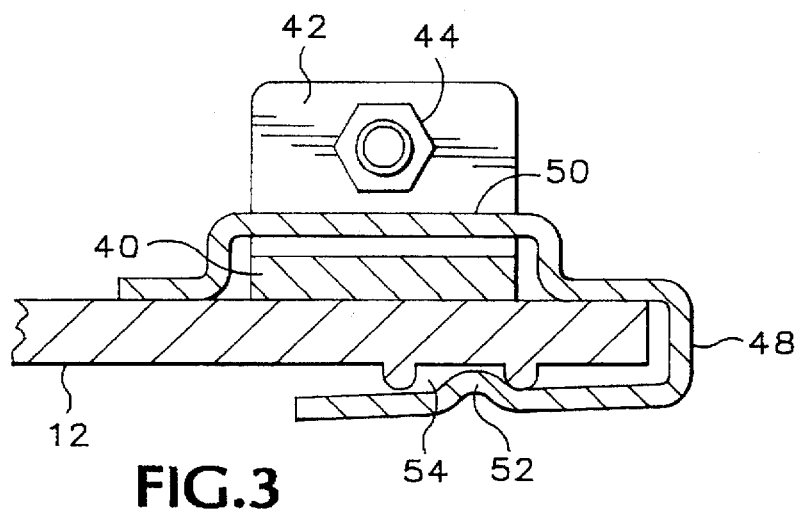
FIG. 3 is a transverse section taken on the line 3—3 in FIG. 1.

In accordance with this invention, and with reference to FIGS. 1 and 2 of the drawings, movement of the potentiometer arm 26 is utilized to operate an electric switch 32 secured to the mounting plate 12, as by screws 34. Conductors 36 extend from the switch for connection in an electric circuit of the engine brake or other electrical device. Thus, when the switch 32 is closed, the electric circuit of the electrical device is completed and the device is activated. Conversely, when the switch is opened, the electric circuit of the electrical device is opened and the device is deactivated.

The switch 32 is provided with a spring loaded plunger 38 the movement of which opens and closes the switch. Thus, when the plunger is moved into the body of the switch, the switch is closed and when the plunger is extended outwardly of the switch body, the switch is opened.

In the preferred embodiment illustrated, movement of the plunger 38 is effected by an elongated link member bar 40 provided at one end with an upturned contact end 42 for operating the plunger. A threaded screw 44 extends from the contact end 42 for adjustable abutment against the plunger 38. The opposite end of the link member is formed as an arcuate coupler 46 configured to overlie and capture the upper portion of the roller 28.

A U-shaped spring clip 48 is provided on its upper side with a channel 50 configured to overlie and capture the link member 40 for guided movement toward and away from the switch plunger 38. The underside of the clip is formed with a detent 52 configured for reception in a longitudinal groove 54 in the underside of the mounting plate 12, to secure the clip in operative position retaining and guiding the movement of the link member 40.

In the operation of the control switch attachment of this invention, let it be assumed that the computer is not programmed for operation of the engine brake and that the electric circuit of switch 32 is connected to the engine brake. The link member 40 is installed by first pivoting the potentiometer arm 26 forwardly toward the upper end of the accelerator pedal 16 to allow the arcuate couple 46 to be fitted over the roller 28. The arm 26 then is allowed to pivot back to its idle position, and the link member is placed upon the upper surface of the mounting plate, with the contact end 44 abutting the switch actuator plunger 38. The guide clip 48 then is snapped into place to retain and guide the link member.

The position of the guide clip 48 on the link member 40 is automatically established by moving the link member through its range of longitudinal movement, by operation of the accelerator pedal 16. Thus, the clip is moved along the mounting plate 12 by abutment of the contact end 42, whereby the clip is positioned on the mounting plate intermediate the ends thereof, with the channel 50 guiding the longitudinal movement of the link member.

When the accelerator pedal is pivoted to effect acceleration of the engine, the potentiometer arm 26 is pivoted to move the roller 28 forwardly along the mounting plate 12. The link member 40 also is moved forwardly with the roller, thereby moving the contact end 44 away from the switch actuator plunger 38. The switch 32 thus is opened, thereby deactivating the engine brake.

When the accelerator pedal is pivoted to the idle position, the potentiometer arm 26 is pivoted to move the roller 28 rearwardly along the mounting plate. The link member 40 also is moved rearwardly with the roller, thereby moving the contact end 44 into engagement with the plunger 38. The switch 32 thus is closed, activating the engine brake.

From the foregoing, it will be apparent that the components 32-48 constitute a simplified and economical removable attachment to a conventional electronic foot accelerator pedal by which control of an electrically actuated engine brake may be effected, rather than incurring the expense of re-programming the computer. In the event a decision is made later to switch to the computer controlled engine brake, the attachment of this invention may be removed with speed and facility.

As mentioned hereinbefore, the attachment of this invention may be utilized to control the activation of any of various electrical devices other than an electrically actuated engine brake. For example, it may be used to control actuation of an engine idling timer, or caution lights, or other signals.

It will be apparent to those skilled in the art that various changes may be made in the size, shape, type, number and arrangement of parts described hereinbefore without departing from the spirit of this invention and the scope of the appended claims.

I claim:

1. In combination with a foot accelerator pedal of a vehicle engine wherein the pedal pivotally mounts one end of an arm the opposite end of which mounts a roller for movement along a surface under the pedal when the pedal is moved to control the speed of said engine, an electric switch in an electric circuit of an electrically actuated device, which circuit and device are independent of speed control of the vehicle engine, the electric switch having a switch actuator movable to open and close said switch, and a link member configured at one end to engage and move with said roller as the pedal is moved, the link member being configured at the opposite end to engage said switch actuator, whereby movement of the roller and link member away from said switch actuator opens said switch and movement of the roller and link member toward said switch actuator closes said switch.

2. The combination of claim 1 including a mounting plate pivotally supporting the accelerator pedal and providing the surface for movement of the roller, and wherein the electric switch is mounted on the mounting plate, the link member comprises an elongated bar formed at one end with an arcuate coupler configured to engage an upper portion of the roller and formed at the opposite end with a contact member configured for releasable engagement with said switch actuator, and guide means interengages the link member and mounting plate for guiding movement of the link member.

3. The combination of claim 2 wherein the guide means comprises a resilient clip configured with a guide channel on its upper side slidably receiving said link member, and retainer means on its lower side releasably engaging the mounting plate.

4. The combination of claim 1 wherein the pedal mounts a potentiometer connected in the electric circuit of an electric control module of an electronic engine control, and the arm is connected to the movable contact of the potentiometer for varying the speed of the engine as the accelerator pedal is moved, whereby movement of the roller and link member away from said switch actuator opens said switch during acceleration of the engine and movement of the roller and link member toward said switch actuator closes said switch when the accelerator pedal reaches idle position.

5. The combination of claim 4 including a mounting plate pivotally supporting the accelerator pedal and providing the surface for movement of the roller, and wherein the electric switch is mounted on the mounting plate, the link member comprises an elongated bar formed at one end with an arcuate coupler configured to engage an upper portion of the roller and formed at the opposite end with a contact member configured for releasable engagement with said switch actuator, and guide means interengages the link member and mounting plate for guiding movement of the link member.

6. The combination of claim 5 wherein the guide means comprises a resilient clip configured with a guide channel on its upper side slidably receiving said link member, and retainer means on its lower side releasably engaging the mounting plate.

7. The combination of claim 4 wherein the engine has an electrically controlled brake, and the electric switch is in the electric circuit of the electrically controlled brake.

8. In combination with a foot accelerator pedal of a vehicle engine wherein the pedal is mounted pivotally on the vehicle and functions by pivoting to control the speed of said engine, an electric switch in an electric circuit of an electrically actuated device, which circuit and device are independent of speed control of the vehicle engine, the electric switch having a switch actuator movable to open and close said switch, and switch operator means interengaging said pedal and switch actuator for opening the electric switch when said pedal is moved from engine idling position to engine accelerating position and for closing the electric switch when said pedal is moved to engine idling position.

9. The combination of claim 8 wherein the electrically actuated device is the electrically controlled engine brake of a vehicle, the electric circuit includes said electrically operated engine brake, and the switch operator means opens the electric switch and deactivates the engine brake when said pedal is moved to engine accelerating position and closes the electric switch and actuates the engine brake when said pedal is moved to engine idling position.

* * * * *